(12) United States Patent
Baek et al.

(10) Patent No.: US 8,384,987 B2
(45) Date of Patent: Feb. 26, 2013

(54) ELECTROPHORETIC DISPLAY DEVICE AND METHOD OF MANUFACTURING THE DEVICE

(75) Inventors: Seung-Jin Baek, Seoul (KR); Nam-Seok Roh, Seongnam-si (KR); Sang-Il Kim, Yongin-si (KR); Woo-Jae Lee, Yongin-si (KR); Mi-Jung Han, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 1074 days.

(21) Appl. No.: 12/267,913

(22) Filed: Nov. 10, 2008

(65) Prior Publication Data
US 2009/0135467 A1 May 28, 2009

(30) Foreign Application Priority Data
Nov. 23, 2007 (KR) .................. 10-2007-0120407

(51) Int. Cl.
*G02B 26/00* (2006.01)
*G09G 3/34* (2006.01)

(52) U.S. Cl. ........................................ 359/296; 345/107

(58) Field of Classification Search .................. 359/296; 430/32, 34, 38; 345/107, 105; 204/450, 204/600
See application file for complete search history.

(56) References Cited

U.S. PATENT DOCUMENTS

| | | | |
|---|---|---|---|
| 6,850,355 B2 * | 2/2005 | Liang et al. | 359/296 |
| 7,177,067 B1 * | 2/2007 | Sakamoto | 359/296 |
| 7,649,669 B2 * | 1/2010 | Abe | 359/273 |

* cited by examiner

*Primary Examiner* — Tuyen Tra
(74) *Attorney, Agent, or Firm* — H.C. Park & Associates, PLC

(57) ABSTRACT

An electrophoretic display (EPD) device and a method of manufacturing the EPD are disclosed. An EPD device includes a first substrate, a second substrate, and an electrophoretic layer. The first substrate includes a plurality of pixel areas, and each pixel area includes a first electrode. The second substrate faces the first substrate and includes a second electrode to form an electric field with the first electrode and a color filter corresponding to the first electrode. The electrophoretic layer is disposed between the first substrate and the second substrate and is controlled by an electric field formed by the first electrode and the second electrode to display an image. An end portion of the color filter extends beyond an end portion of the first electrode.

19 Claims, 4 Drawing Sheets

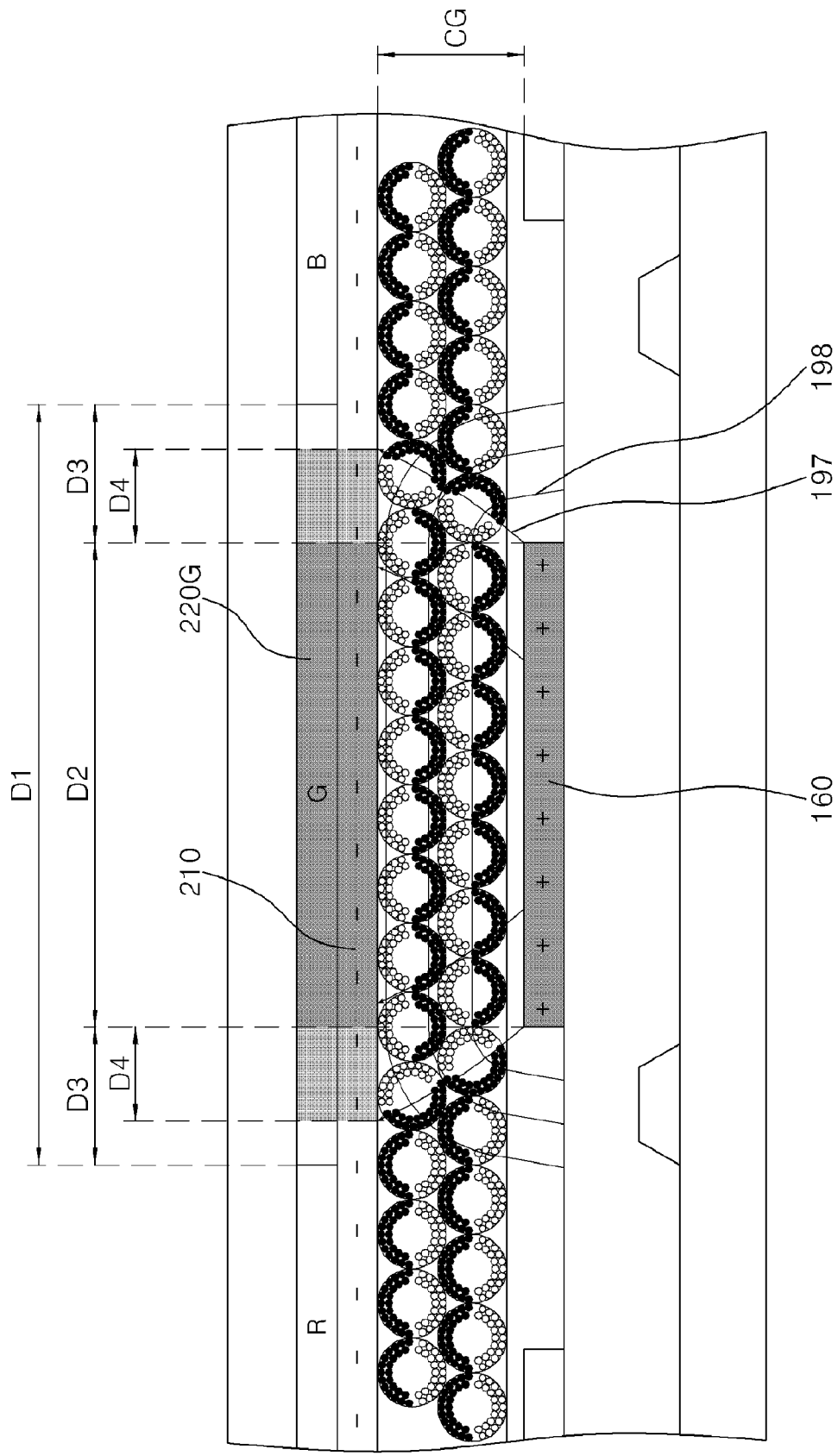

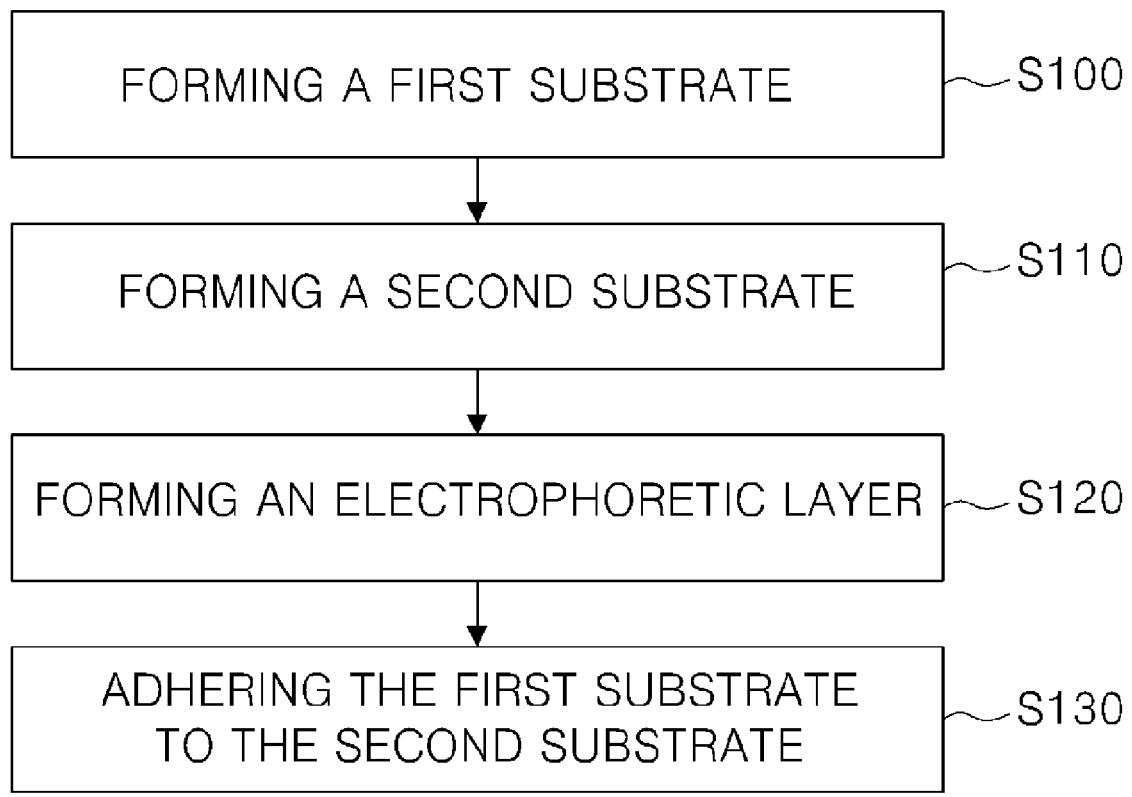

ELECTROPHORETIC DISPLAY DEVICE AND METHOD OF MANUFACTURING THE DEVICE

CROSS-REFERENCE TO RELATED APPLICATION

This application claims priority from and the benefit of Korean Patent Application No. 10-2007-0120407, filed on Nov. 23, 2007, which is hereby incorporated by reference for all purposes as if fully set forth herein.

BACKGROUND OF THE INVENTION

1. Field of the Invention

The present invention relates to an electrophoretic display device. More particularly, the present invention relates to an electrophoretic display device that may provide an improved reflection ratio and improved color reproducibility.

2. Discussion of the Background

Information display devices have become more important because modern society is an information society. Therefore, information display devices, such as a liquid crystal display (LCD) device, an electrophoretic display (EPD) device, a plasma display panel (PDP), and so on, have been introduced. Recently, the EPD, which may provide a user with a comfortable viewing feeling, has been focused on.

The EPD may have a high reflection ratio, a high contrast ratio, a wide view-angle, and may provide a user with a comfortable view, for example, the user may feel as if he is viewing a sheet of paper. The EPD has specific characteristics, which are stable when both black and white colors are displayed, and an image of the EPD may be sustained without continuous application of a voltage, so that the power consumption may be low. Moreover, the EPD does not require a polarizer, an alignment layer, liquid crystals, etc., so the EPD may have competitive manufacturing costs.

The EPD generally includes an electrophoretic layer including a micro capsule or a partition micro cup having white and black charged particles, and the EPD displays black and white color images. Moreover, a color filter may be disposed on the electrophoretic layer to display various colors.

However, a fringe electric field, which is formed in each pixel area, may influence adjacent pixel areas, which may deteriorate color reproducibility and brightness.

SUMMARY OF THE INVENTION

The present invention provides an electrophoretic display (EPD) device that may provide an improved reflection ratio and improved color reproducibility by preventing color mixing.

The present invention also provides a method of manufacturing the EPD device.

Additional features of the invention will be set forth in the description which follows, and in part will be apparent from the description, or may be learned by practice of the invention.

The present invention discloses an EPD device including a first substrate, a second substrate, and an electrophoretic layer. The first substrate includes a plurality of pixel areas, and each pixel area includes a first electrode. The second substrate faces the first substrate and includes a second electrode to form an electric field with the first electrode and a color filter corresponding to the first electrode. The electrophoretic layer is disposed between the first substrate and the second substrate and is controlled by the electric field formed by the first electrode and the second electrode to display an image. An end portion of the color filter extends beyond an end portion of the first electrode.

The present invention also discloses a method of manufacturing an EPD device including forming a first substrate including a plurality of pixel areas, each pixel area including a first electrode, forming a second substrate including a second electrode and a color filter, the second electrode being arranged to face the first substrate and form an electric field with the first electrode, and forming an electrophoretic layer that displays an image when the electric field is formed by the first electrode and the second electrode, the electrophoretic layer being arranged between the first substrate and the second substrate. An end portion of the color filter extends beyond an end portion of the first electrode. The present invention also discloses an EPD device including a first substrate, a second substrate, and an electrophoretic layer. The first substrate includes a plurality of pixel areas, and each pixel area includes a first electrode. The second substrate faces the first substrate and includes a second electrode to form an electric field with the first electrode and a color filter corresponding to the first electrode. The electrophoretic layer is disposed between the first substrate and the second substrate and is controlled by the electric field formed by the first electrode and the second electrode to display an image. A center of the color filter corresponds to a center of a first electrode, and the color filter is wider than the first electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 3 is a cross-sectional view showing an EPD device in accordance with an exemplary embodiment of the present invention.

FIG. 4 is a flow chart showing a method of manufacturing an EPD device in accordance with an exemplary embodiment of the present invention.

DETAILED DESCRIPTION OF THE ILLUSTRATED EMBODIMENTS

Figure 1:
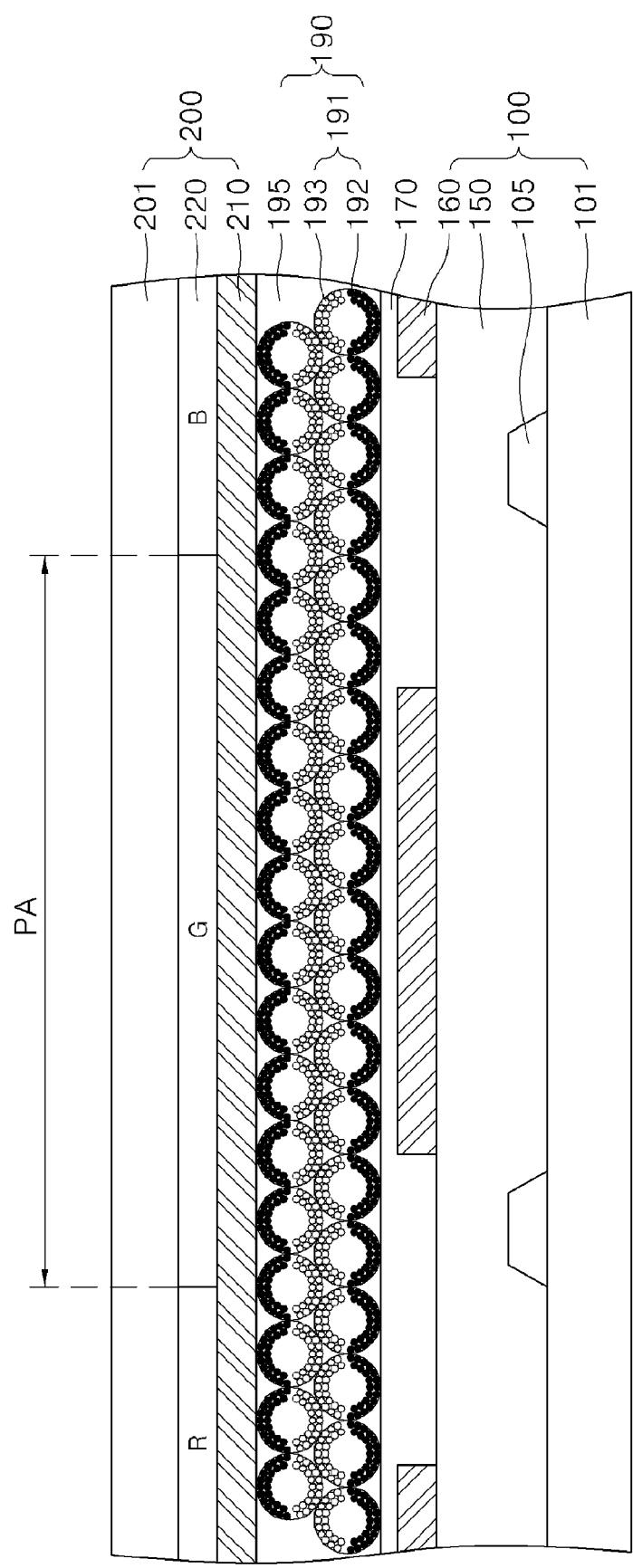
FIG. 1 is a cross-sectional view showing an electrophoretic display (EPD) device in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to," or "coupled to"

another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 2:
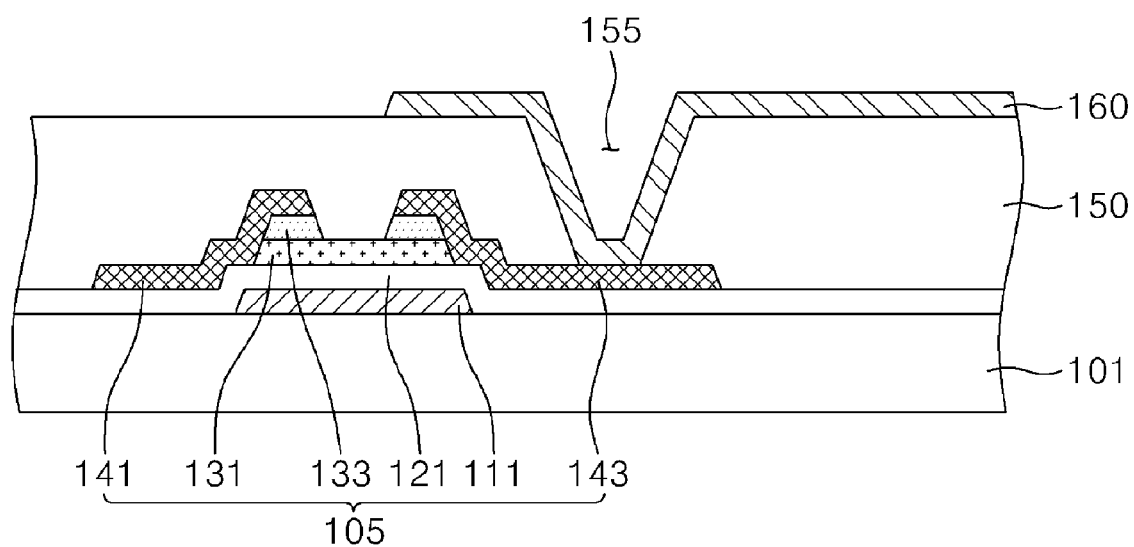
FIG. 2 is a cross-sectional view of the thin film transistor of FIG. 1.

FIG. 1 is a cross-sectional view showing an electrophoretic display (EPD) device in accordance with an exemplary embodiment of the present invention. FIG. 2 is a cross-sectional view of the thin film transistor in FIG. 1.

Referring to FIG. 1 and FIG. 2, an EPD device in accordance with an exemplary embodiment of the present invention includes a first substrate 100, a second substrate 200, and an electrophoretic layer 190.

The first substrate 100 includes a lower substrate 101, a thin film transistor (TFT) 105, a protection layer 150, and a first electrode 160.

The lower substrate 101 may include an insulation material, such as a glass or a plastic.

A TFT 105 is disposed in each red, green, and blue pixel area PA. The TFT 105 includes a gate electrode 111, a gate insulation layer 121, an ohmic contact layer 133, a source electrode 141, and a drain electrode 143, which are disposed on the lower substrate 101.

The gate electrode 111 is disposed on the lower substrate 101 and connected to a gate line. The gate line extends in a first direction on the lower substrate 101. The gate insulation layer 121 includes an insulation material and is disposed on the gate electrode 111 and the gate line. For example, the gate insulation layer 121 may include silicon nitride ($SiN_x$), silicon oxide ($SiO_x$), etc, and may be disposed on the first substrate 100.

An active layer 131 is disposed on the gate insulation layer 121 to overlap with the gate electrode 111. For example, the active layer 131 may be disposed on the gate insulation layer 121 by patterning amorphous silicon. The active layer 131 may include poly-silicon. The ohmic contact layer 133 may include amorphous silicon implanted with an impurity and is disposed on the active layer 131.

The source electrode 141 is disposed on the gate insulation layer 121 and the ohmic contact layer 133, connected to a data line, and overlaps with the gate electrode 111. The drain electrode 143 overlaps with the gate electrode 111 and faces the source electrode 141. The source electrode 141 and the drain electrode 143 may include the same material as the data line.

The protection layer 150 is disposed on the gate insulation layer 121, the active layer 133, the source electrode 141, and the drain electrode 143 for insulation and planarization. The protection layer 150 may be one of an inorganic protection layer and an organic protection layer to improve insulation and off-characteristics of the TFT 105. The protection layer 150 includes a contact hole 155 exposing a portion of the drain electrode 143.

The first electrode 160 is disposed on the protection layer 150 and is connected to the drain electrode 143 of the TFT 105 through the contact hole 155. The first electrode 160 may include a transparent conductive material. For example, the first electrode 160 may include indium tin oxide (ITO), indium zinc oxide (IZO), etc.

The electrophoretic layer 190 includes a micro capsule 191 and a suspension solvent 195.

The micro capsule 191 includes black charged particles 192 and white charged particles 193. Each black charged particle 192 has black color and is positively charged, and each white charged particle 193 has white color and is negatively charged. When voltages are applied to the first electrode 160 and the second electrode 210 to form an electric field, which is caused by a voltage difference between the two electrodes 160 and 210, the black charged particles 192 and the white charged particles 193 in the micro capsule 191 move toward opposite charges, respectively. Thus, each charged color particle 192 and 193 reflects incident light, so that the micro capsule 191 may display an image.

The suspension solvent 195 surrounds the micro capsule 191 to protect the micro capsule 191 from external shocks and to fix the micro capsule 191.

The electrophoretic layer 190 is fixed to the first substrate 100 through an adhesion member 170.

The second substrate 200 includes an upper substrate 201, a second electrode 210, and a color filter 220.

The upper substrate 201 includes an insulation material, such as glass or plastic, which may be the same as the insulation material of the lower substrate 101. The upper substrate 201 may include a plastic having flexibility.

The second electrode 210 is disposed on the entire upper substrate 201 and includes a transparent conductive material. For example, the second electrode 210, like the first electrode 160, may include ITO, IZO, etc. The second electrode 210 forms an electric field with the first electrode 160 to control the movement of the black and white charged particles 192 and 193 of the electrophoretic layer 190.

The color filter 220 is interposed between the upper substrate 201 and the second electrode 210. The color filter 220 includes a red color filter R, a green color filter G, and a blue color filter B that implement a red color, a green color, and a blue color, respectively.

An end portion of the red color filter R, the green color filter G, or the blue color filter B corresponding to the first electrode 160 extends beyond an end portion of the first electrode 160. The first electrode 160 may be smaller than the corresponding red color filter R, green color filter G, or blue color filter B. Mixed color and color blur caused by arrangement failure of the first and the second substrates 100 and 200 and a fringe electric field between the first electrode 160 and the second electrode 210 may be preventable. An arrangement of the first electrode 160 and the color filter 220 may fail when the first substrate 100 and the second substrate 200 are combined. Mixed color occurs when undesired colors are displayed together with a specific desired color due to an arrangement failure of the first electrode 160 and the color filter 220. Color blur occurs when a driving area of the electrophoretic layer 190, which is defined by a fringe electric field, expands and influences adjacent pixel areas PA, so that color characteristics are deteriorated and the reflection color is displayed in an area that is wider than the area of the color filter 220.

FIG. 3 is a cross-sectional view showing an EPD device in accordance with an exemplary embodiment of the present invention.

Referring to FIG. 3, an electric field is formed between a first electrode 160 and a second electrode 210 corresponding to a green color filter 220G in accordance with the exemplary embodiment of the present invention. A horizontal distance of the green color filter 220G is D1, a horizontal distance of the first electrode 160 is D2, a horizontal distance from an end portion of the first electrode 160 to an end portion of the green color filter 220G is D3, and a horizontal distance of a portion of the adjacent pixel area PA that the fringe electric field has influence on is D4.

The electric field between the first electrode 160 and the second electrode 210 in the region of the green color filter 220G draws an equipotential line(198) and extends toward the second electrode 210. When a width of the first electrode 160 is too great, the electric field extends beyond the horizontal distance D1 of the green color filter 220G and influences adjacent pixel areas PA, so that mixed color or color blur may be generated. Thus, color reproducibility and brightness may be reduced.

The horizontal distance D2 of the first electrode 160 is arranged to overlap with the horizontal distance D1 of the green color filter 220G area, and an end portion of the green color filter 220G extends beyond an end portion of the first electrode 160, so that the fringe electric field does not influence an area corresponding to an adjacent red or blue color filter.

The horizontal distance D4 of the portion of the adjacent pixel area PA that the fringe electric field 197 influences depends on a cell gap CG and a driving voltage DV. Therefore, the horizontal distance D4 of the adjacent pixel area PA, which the fringe electric field 197 influences, may be calculated from the cell gap CG and the driving voltage DV. The horizontal distance D3 from the end portion of the first electrode 160 to the end portion of the green color filter 220G may be adjusted using the horizontal distance D4. (Hereinafter, a length of the fringe electric field formed is a fringe electric field length S.) The horizontal distance D3 from the end portion of the first electrode 160 to the end portion of the green color filter 220G may be longer than the fringe electric field length S, so that the influence of the fringe electric field on the adjacent pixel areas PA may be minimized.

In order to determine the relationship between the driving voltage DV and the fringe electric field length S, the change of the fringe electric field length S with the driving voltage DV was measured, as shown in Table 1. The fringe electric field length S was obtained by measuring a length at which the brightness was reduced by a half of the brightness in an overlapping area of the first electrode 160 and the green color filter 220G.

TABLE 1

| Driving Voltage DV [V] | Fringe electric field length S [μm] |
| --- | --- |
| 10 | about 13 |
| 15 | about 20 |
| 20 | about 26 |
| 25 | over drive |

Table 1 represents the fringe electric field length S when the cell gap is 45 μm and the driving voltage DV is 10 V, 15 V, 20 V, and 25 V. The corresponding fringe electric field lengths S are about 13 μm, 20 μm, 26 μm, and over drive.

In order to determine the relationship between the cell gap CG and the fringe electric field length S, a change of the fringe electric field length S with the cell gap CG was measured, as shown in Table 2. The fringe electric field length S was obtained by measuring a length at which the brightness was reduced by a half of the brightness in an overlapping area of the first electrode 160 and the green color filter 220G.

TABLE 2

| Cell Gap CG [μm] | Fringe electric field length S [μm] |
|---|---|
| 30 | about 14.0 |
| 40 | about 18.5 |
| 45 | about 21.0 |
| 55 | Driving disable |

Table 2 represents the fringe electric field length S when the driving voltage DV is 15 V and the cell gap CG is 30 μm, 40 μm, 45 μm, and 55 μm. The corresponding fringe electric field lengths S are about 14 μm, 18.5 μm, 21 μm, and driving disable.

Based on the above experimental result, the fringe electric field length S according to the cell gap and the driving voltage can be determined using Equation 1. Through Equation 1, an approximation of the experimental value may be obtained when the cell gap CG is about 25 μm to about 50 μm and the driving voltage DV is about 15 V to about 20 V.

$$S_{\mu m} = (0.022)*CG_{\mu m}*DV + 0.13*CG_{\eta m}$$ <Equation 1>

The horizontal distance D3 from the end portion of the first electrode 160 to the end portion of the green color filter 220G may be longer than the fringe electric field length S, so that the influence of the fringe electric field on the adjacent pixel areas PA may be minimized. When the size of the first electrode 160 is too small, brightness may be deteriorated, and the horizontal distance D3 from the end portion of the first electrode 160 to the end portion of the green color filter 220G may be substantially the same length as the fringe electric field length S.

For example, when the cell gap CG is 45 μm and the driving voltage DV is 15 V, the fringe electric field length S is 20.7 μm according to Equation 1. Thus, the horizontal distance D3 from the end portion of the first electrode 160 to the end portion of the green color filter 220G may be longer than 20.7 μm. When the cell gap CG is 30 μm and the driving voltage DV is 15 V, the fringe electric field length S is 13.8 μm according to Equation 1. Thus, the horizontal distance D3 from the end portion of the first electrode 160 to the end portion of the green color filter 220G may be longer than 13.8 μm.

The green color filter 220G and the first electrode 160 corresponding to the green color filter 220G are described in the exemplary embodiment of the present invention. However, the present invention may also be applied to electrodes corresponding to a red color filter and a blue color filter.

FIG. 4 is a flow chart showing a method of manufacturing an EPD device in accordance with an exemplary embodiment of the present invention.

Referring to FIG. 4, in a method of manufacturing an EPD device in accordance with an exemplary embodiment of the present invention, a first substrate is formed (S100), a second substrate is formed (S110), an electrophoretic layer is formed (S120), and the first substrate is adhered to the second substrate (S130).

When forming the first substrate (S100), a gate metallic layer is formed on a lower substrate by a depositing process, such as sputtering, and a gate metallic pattern group including a gate line and a gate electrode is formed by a patterning process.

A gate insulation layer may be formed on the lower substrate having the gate metallic pattern group by a plasma enhanced chemical vapor deposition ("PECVD").

After forming the gate insulation layer, amorphous silicon and amorphous silicon implanted with impurities are deposited on the gate insulation layer, and the amorphous silicon and the amorphous silicon implanted with impurities are patterned to form an active layer and an ohmic contact layer, respectively.

A data metallic layer is deposited on the gate insulation layer and the ohmic contact layer, and the data metallic layer is patterned to form a data metallic pattern group including a data line, a source electrode, and a drain electrode.

One of an inorganic insulation material and an organic insulation material is deposited on the gate insulation layer and the data metallic pattern group by a process, such as PECVD, to form a protection layer. A contact hole is formed to expose a portion of the drain electrode by etching the protection layer.

A transparent conductive material is deposited on the protection layer and is patterned to form a first electrode. The first electrode is formed to contact the drain electrode via the contact hole. The first electrode is smaller than the red, green or blue color filter corresponding to the first electrode. An end portion of the color filter extends beyond an end portion of the corresponding first electrode, so that the first electrode overlaps with the color filter.

The size of the first electrode is decided by a fringe electric field length S. The fringe electric field length S is calculated using the cell gap between the first electrode and a second electrode and the driving voltage driving the electrophoretic layer. The size of the first electrode may be diverse according to demands in each product. The size of the first electrode according to the fringe electric field length S may be adjusted so that adjacent pixel areas PA are not influenced, which may minimize mixed color and color blur.

When forming the second substrate (S110), a color filter dye for displaying a color is coated on an upper substrate and patterned by an etching process. Thus, red, green, and blue color filters are formed.

A transparent conductive material is formed on the color filters to form a second electrode. For example, the second electrode may be formed by depositing ITO or IZO over the entire upper substrate.

When forming the electrophoretic layer (S120), an adhesion member is formed on a micro capsule and a suspension solvent. A release film is attached to the adhesion member.

When adhering the first substrate to the second substrate, the release film is attached to the adhesion member of the electrophoretic layer. The first substrate, the second substrate, and the electrophoretic layer may be adhered through a lamination method, for example, using a roller.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:
1. An electrophoretic display (EPD) device, comprising:
a first substrate comprising a plurality of pixel areas, each pixel area comprising a first electrode;
a second substrate facing the first substrate, the second substrate comprising a second electrode to form an electric field with the first electrode and a color filter corresponding to the first electrode; and
an electrophoretic layer disposed between the first substrate and the second substrate, the electrophoretic layer being controlled by an electric field formed by the first electrode and the second electrode to display an image, wherein an end portion of the color filter extends beyond an end portion of the first electrode.

2. The EPD device of claim 1, wherein a horizontal distance from the end portion of the first electrode to the end portion of the color filter is greater than a length of a fringe electrical field area that influences an adjacent pixel area.

3. The EPD device of claim 2, wherein the length of the fringe electrical field area satisfies a first equation when the length of the fringe electrical field area is S and a distance between the first electrode and the second electrode is CG and a driving voltage to drive the electrophoretic layer is DV, and
wherein the first equation is:

$$S_{\mu m}=(0.022)*CG_{\mu m}*DV+0.13*CG_{\mu m}.$$

4. The EPD device of claim 3, wherein the length of the fringe electrical field is about 20.7 μm when the CG is about 45 μm and the DV is about 15 V.

5. The EPD device of claim 3, wherein the length of the fringe electrical field is about 13.8 μm when the CG is about 30 μm and the DV is about 15 V.

6. The EPD device of claim 1, wherein the electrophoretic layer comprises a micro capsule, the micro capsule comprising:
an insulation material;
a white charged particle dispersed in the insulation material and charged with a constant polarity; and
a black charged particle dispersed in the insulation material and charged with a constant polarity that is opposite the polarity of the white charged particle.

7. The EPD device of claim 1, wherein the electrophoretic layer is further disposed below the color filter.

8. A method of manufacturing an electrophoretic display (EPD) device, comprising:
forming a first substrate comprising a plurality of pixel areas, each pixel area comprising a first electrode;
forming a second substrate comprising a second electrode and a color filter, the second electrode being arranged to face the first substrate and form an electric field with the first electrode; and
forming an electrophoretic layer that displays an image when the electric field is formed by the first electrode and the second electrode, the electrophoretic layer being arranged between the first substrate and the second substrate,
wherein an end portion of the color filter extends beyond an end portion of the first electrode,
wherein a horizontal distance from the end portion of the first electrode to the end portion of the color filter is greater than a length of a fringe electrical field area that influences an adjacent pixel area.

9. The method of claim 8, wherein the length of the fringe electrical field area satisfies a first equation when the length of the fringe electrical field area is S and a distance between the first electrode and the second electrode is CG and a driving voltage for driving the electrophoretic layer is DV, and
wherein the first equation is:

$$S_{\mu m}=(0.022)*CG_{\mu m}*DV+0.13*CG_{\mu m}.$$

10. The method of claim 9, wherein the length of the fringe electrical field is about 20.7 μm when the CG is about 45 μm and the DV is about 15 V.

11. The method of claim 9, wherein the length of the fringe electrical field is about 13.8 μm when the CG is about 30 μm and the DV is about 15 V.

12. The method of claim 8, wherein the electrophoretic layer comprises a micro capsule, the micro capsule comprising:
an insulation material;
a white charged particle dispersed in the insulation material and charged with a constant polarity; and
a black charged particle dispersed in the insulation material and charged with a constant polarity that is opposite the polarity of the white charged particle.

13. The method of claim 8, wherein the electrophoretic layer is further arranged below the color filter.

14. An electrophoretic display (EPD) device, comprising:
a first substrate comprising a plurality of pixel areas, each pixel area comprising a first electrode;
a second substrate facing the first substrate, the second substrate comprising a second electrode to form an electric field with the first electrode and a color filter corresponding to the first electrode; and
an electrophoretic layer disposed between the first substrate and the second substrate, the electrophoretic layer being controlled by an electric field formed by the first electrode and the second electrode to display an image,
wherein a center of the color filter corresponds to a center of a first electrode, and
wherein the color filter is wider than the first electrode.

15. The EPD device of claim 14, wherein a horizontal distance from an end portion of the first electrode to an end portion of the color filter is greater than a length of a fringe electrical field area that influences an adjacent pixel area.

16. The EPD device of claim 15, wherein the horizontal distance from the end portion of the first electrode to the end portion of the color filter is greater than 20.7 μm.

17. The EPD device of claim 15, wherein a distance between the first electrode and the second electrode is about 45 μm.

18. The EPD device of claim 14, wherein the electrophoretic layer comprises a micro capsule, the micro capsule comprising:
an insulation material;
a white charged particle dispersed in the insulation material and charged with a constant polarity; and
a black charged particle dispersed in the insulation material and charged with a constant polarity that is opposite the polarity of the white charged particle.

19. The EPD device of claim 14, wherein the electrophoretic layer is further disposed below the color filter.

* * * * *